US012700598B2

(12) United States Patent
Kim et al.

(10) Patent No.: US 12,700,598 B2
(45) Date of Patent: Aug. 4, 2026

(54) STAINLESS STEEL FOR FUEL CELL SEPARATOR

(71) Applicant: POSCO, Pohang-si (KR)

(72) Inventors: Kwangmin Kim, Pohang-si (KR); Yongho Kim, Pohang-si (KR); Bo-sung Seo, Pohang-si (KR); Dong-hoon Kim, Pohang-si (KR)

(73) Assignee: POSCO CO., LTD, Pohang-si (KR)

( * ) Notice: Subject to any disclaimer, the term of this patent is extended or adjusted under 35 U.S.C. 154(b) by 726 days.

(21) Appl. No.: 17/924,530

(22) PCT Filed: Oct. 16, 2020

(86) PCT No.: PCT/KR2020/014195
§ 371 (c)(1),
(2) Date: Nov. 10, 2022

(87) PCT Pub. No.: WO2021/241812
PCT Pub. Date: Dec. 2, 2021

(65) Prior Publication Data
US 2023/0231150 A1      Jul. 20, 2023

(30) Foreign Application Priority Data
May 29, 2020    (KR) ........................ 10-2020-0065190

(51) Int. Cl.
*H01M 8/021*        (2016.01)
*C22C 38/00*        (2006.01)
(Continued)

(52) U.S. Cl.
CPC ........... *H01M 8/021* (2013.01); *C22C 38/001* (2013.01); *C22C 38/004* (2013.01); *C22C 38/02* (2013.01);
(Continued)

(58) Field of Classification Search
None
See application file for complete search history.

(56) References Cited

U.S. PATENT DOCUMENTS

2014/0272668 A1*   9/2014   Nagoshi ................. C21D 6/004
                                                       429/509
2021/0254203 A1*   8/2021   Kim ........................ C23C 22/34
(Continued)

FOREIGN PATENT DOCUMENTS

CN        1271027 A      10/2000
CN        107925040 A     4/2018
(Continued)

OTHER PUBLICATIONS

Partial Supplementary European Search Report dated Aug. 3, 2023 issued in European Patent Application No. 20937849.6.
(Continued)

*Primary Examiner* — Kevin M Bernatz
(74) *Attorney, Agent, or Firm* — Morgan Lewis & Bockius LLP

(57)            ABSTRACT

Disclosed is a stainless steel for a fuel cell separator, more specifically, a stainless steel for a fuel cell separator having a low contact resistance. According to an embodiment of the stainless steel for a fuel cell separator disclosed herein, an arithmetic mean summit curvature Ssc of the surface defined according to the ISO 25178 standard is at least $6.0 \ \mu m^{-1}$, a root mean square surface slope Sdq is at least 23, and a contact resistance is at most $10 \ m\Omega \cdot cm^2$.

6 Claims, 2 Drawing Sheets

(51) Int. Cl.

| | |
|---|---|
| *C22C 38/02* | (2006.01) |
| *C22C 38/04* | (2006.01) |
| *C22C 38/34* | (2006.01) |
| *C22C 38/44* | (2006.01) |
| *C22C 38/46* | (2006.01) |
| *C22C 38/48* | (2006.01) |
| *C22C 38/50* | (2006.01) |
| *C25D 11/34* | (2006.01) |

(52) U.S. Cl.
CPC .............. *C22C 38/04* (2013.01); *C22C 38/34* (2013.01); *C22C 38/44* (2013.01); *C22C 38/46* (2013.01); *C22C 38/48* (2013.01); *C22C 38/50* (2013.01); *C25D 11/34* (2013.01)

(56) References Cited

U.S. PATENT DOCUMENTS

| | | | |
|---|---|---|---|
| 2024/0105960 A1* | 3/2024 | Kawamura | H01M 4/70 |
| 2024/0301539 A1* | 9/2024 | Lu | C25F 3/06 |
| 2025/0023020 A1* | 1/2025 | Maas | H01M 4/386 |
| 2025/0059615 A1* | 2/2025 | Nishida | C22C 38/20 |

FOREIGN PATENT DOCUMENTS

| | | | | |
|---|---|---|---|---|
| CN | 108368612 | A | | 8/2018 |
| EP | 1046723 | A1 | | 10/2000 |
| EP | 3392372 | A1 | | 10/2018 |
| JP | 2012-514297 | A | | 6/2012 |
| JP | 2013129896 | A | * | 7/2013 |
| JP | 2016211076 | A | * | 12/2016 |
| JP | 2018-534416 | A | | 11/2018 |
| JP | 2019-502816 | A | | 1/2019 |
| JP | 2020-063493 | A | | 4/2020 |
| KR | 10-2002-0068964 | A | | 8/2002 |
| KR | 20020068964 | A | * | 8/2002 ........... C22C 38/007 |
| KR | 10-2011-0094592 | A | | 8/2011 |
| KR | 20110094592 | A | * | 8/2011 ............... C23C 8/26 |
| KR | 10-2017-0035374 | A | | 3/2017 |
| WO | 2013/018322 | A1 | | 2/2013 |
| WO | 2013/080533 | A1 | | 6/2013 |

OTHER PUBLICATIONS

International Search Report dated Feb. 26, 2021 issued in International Patent Application No. PCT/KR2020/014195 (with English translation).

Canadian Office Action dated Jun. 26, 2025 issued in Canadian Patent Application No. 3179117.

Office Action dated Aug. 15, 2024, issued in corresponding Chinese Patent Application No. 202080101329.0 with an English translation.

Office Action issued Mar. 21, 2024 for Canadian Patent Application No. 3,179,117.

Office Action dated Mar. 26, 2025, issued in corresponding Chinese Patent Application No. 202080101329.0 with an English translation.

Extended European Search Report dated Nov. 6, 2023 issued in European Patent Application No. 20937849.6.

K. Konefal, et al., "Improved corrosion resistance of stainless steel X6CrNiMoTi17-12-2 by slide diamond burnishing," Journal of Materials Processing Technology, vol. 213, 2013, pp. 1997-2004.

European Communication dated Nov. 23, 2023 issued in European Patent Application No. 20937849.6.

Japanese Office Action dated Dec. 19, 2023 issued in Japanese Patent Application No. 2022-573580 (with English translation).

* cited by examiner

【FIG. 1】
CONTACT RESISTANCE
(mΩ·cm²)
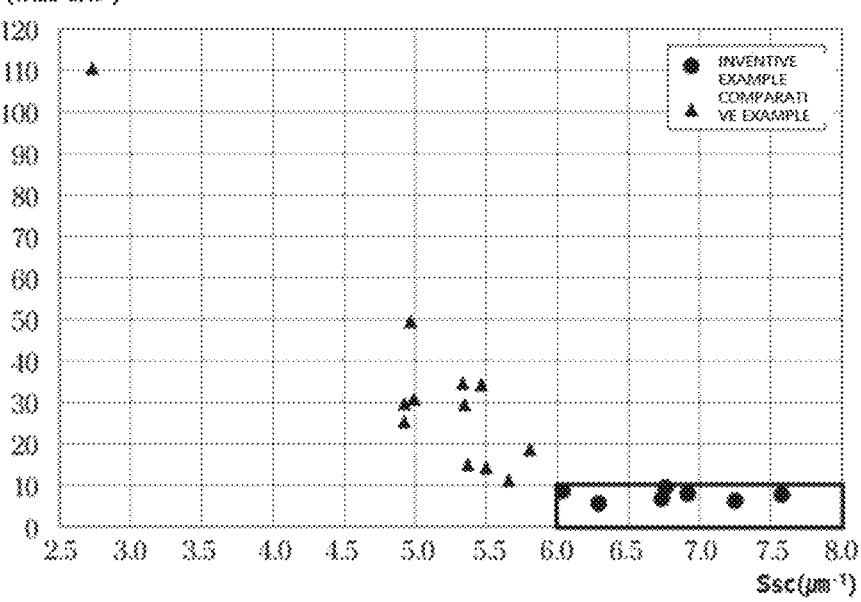
【FIG. 2】
CONTACT
RESISTANCE
(mΩ·cm²)
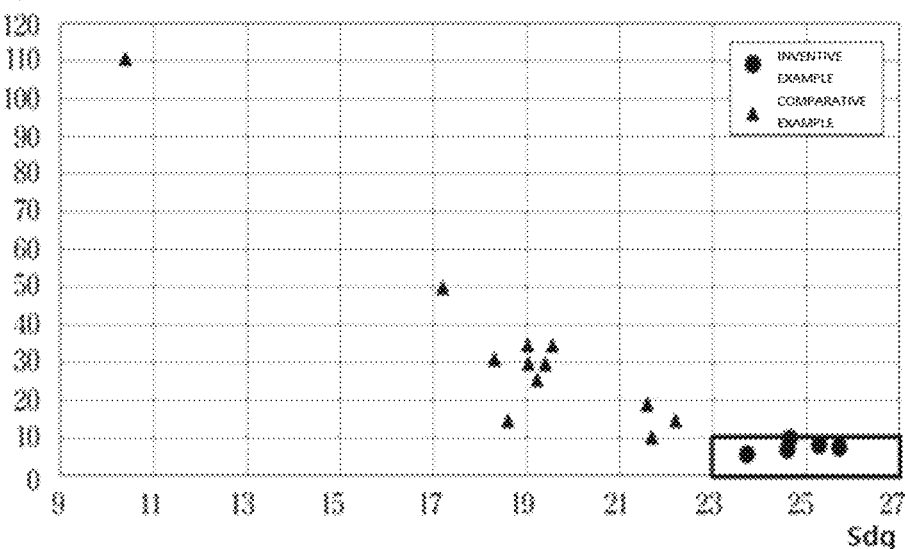

【FIG. 3】
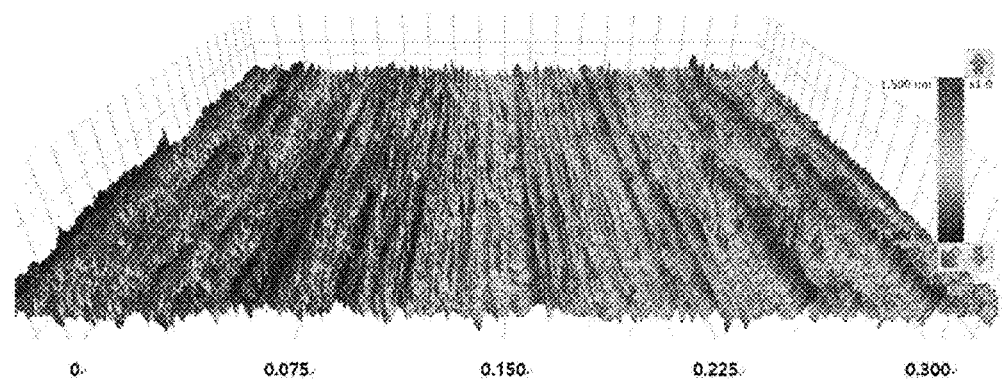
【FIG. 4】
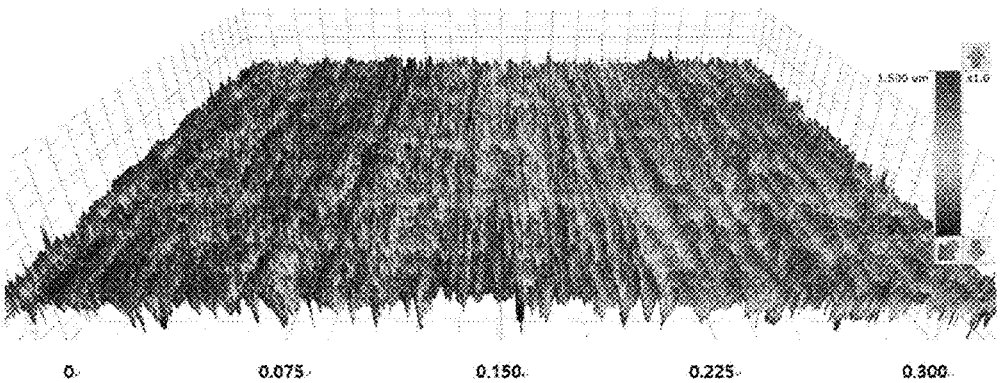

STAINLESS STEEL FOR FUEL CELL SEPARATOR

CROSS-REFERENCE OF RELATED APPLICATIONS

This application is the U.S. National Phase under 35 U.S.C. § 371 of International Patent Application No. PCT/KR2020/014195, filed on Oct. 16, 2020 which claims priority to and the benefit of Korean Application No. 10-2020-0065190 filed on May 29, 2020, the entire contents of which are incorporated herein by reference.

TECHNICAL FIELD

The present disclosure relates to a stainless steel for a fuel cell separator, and more particularly, to a stainless steel for a fuel cell separator having a low contact resistance.

BACKGROUND ART

A fuel cell has a unit cell structure in which a gas diffusion layer (GDL) and a separator are stacked on both sides of a membrane electrode assembly (MEA) formed of an electrolyte and electrodes, i.e., an anode and a cathode, and a structure consisting of individual unit cells connected in series is referred to as a fuel cell stack. A separator is in contact with a gas diffusion layer, and a contact resistance generated in an interface between the separator and the gas diffusion layer deteriorates performance of a fuel cell.

The contact resistance of the separator is mainly affected by two factors. First, a passivated layer of an oxide layer formed on the surface of a metallic separator affects the contact resistance. Although a separator has a high corrosion resistance by the passivated layer, the passivated layer, as a non-conductive oxide layer, increases a contact resistance, and thus it is preferable that the passivated layer is as thin as possible. Second, a contact area between the separator and the gas diffusion layer affects the contact resistance. The separator and the gas diffusion layer have different surface roughnesses, and an actual contact area between two materials having different surface roughnesses significantly affects a contact resistance. As the contact area between the separator and the gas diffusion layer increases, the contact resistance tends to decrease. As the contact area decreases, the contact resistance tends to increase.

As an attempt to reduce contact resistance by controlling a surface shape, a stainless steel separator having peaks on the surface was used in Patent Document 1. Specifically, it is preferable that as a surface roughness parameter, a center line average surface roughness (Ra), in other words, arithmetic average surface roughness, is from 0.03 to 2 μm according to the document.

However, it is difficult to accurately predict an actual contact area between a separator and a gas diffusion layer only using the range of center line average surface roughness that is a two-dimensional (2D) surface parameter. Thus, although a stainless steel has an average roughness range similar to the average roughness of Patent Document 1, a contact resistance may be different and thus there may be a problem in that it is difficult to predict a change in contact resistance. Therefore, in order to realize a surface shape capable of maximizing an actual contact area between the separator and the gas diffusion layer, there is a need to develop a new surface parameter to control the surface shape.

(Patent Document 0001) Japanese Patent Laid-open Publication No. 2002-270196 (Published on Sep. 20, 2002).

DISCLOSURE

Technical Problem

To solve the above-described problems, provided is a stainless steel for a fuel cell separator having a low contact resistance by realizing a surface shape capable of maximizing an actual contact area between a gas diffusion layer and a separator.

Technical Solution

In accordance with an aspect of the present disclosure to achieve the above-described objects, provided is a stainless steel for a fuel cell separator wherein an arithmetic mean summit curvature (Ssc) of a surface defined according to the ISO 25178 standard is at least 6.0 $\mu m^{-1}$, a root mean square surface slope (Sdq) is at least 23, and a contact resistance is at most 10 $m\Omega \cdot cm^2$.

In addition, in the stainless steel for a fuel cell separator, the stainless steel may be a ferritic stainless steel comprising, in percent by weight (wt %), at most 0.02% of C, at most 0.02% of N, 15 to 35% of Cr, at most 0.03% of C+N, and the balance of Fe and other inevitable impurities. In addition, the ferritic stainless steel may further include at least one of, in percent by weight (wt %), at most 0.4% of Si, at most 0.2% of Mn, at most 2% of Cu, and at most 1.0% of a sum of Ti, Nb, and V.

In addition, in the stainless steel for a fuel cell separator, the stainless steel may be an austenitic stainless steel comprising, in percent by weight (wt %), at most 0.09% of C, 15 to 30% of Cr, 7 to 15% of Ni, and the balance of Fe and other inevitable impurities. In addition, the austenitic stainless steel may further include at least one of, in percent by weight (wt %), at most 2.5% of Si, at most 3% of Mn, at most 3% of Mo, at most 0.3% of N, and at most 1.0% of a sum of Ti, Nb, and V.

In addition, in the stainless steel for a fuel cell separator, a thickness of a passivated layer may be at most 3 nm.

In accordance with another aspect of the present disclosure to achieve the above-described objects, a method for manufacturing a stainless steel for a fuel cell separator includes immersing a cold-rolled stainless steel sheet in a sulfuric acid solution, performing a primary electrolysis at a current density of 0.16 to 0.48 $A/cm^2$ and a secondary electrolysis at a current density of 0.03 to 0.08 $A/cm^2$, and immersing the stainless steel sheet in a mixed acid solution to prepare the stainless steel, wherein an arithmetic mean summit curvature (Ssc) of a surface defined according to the ISO 25178 standard is at least 6.0 $\mu m^{-1}$, a root mean square surface slope (Sdq) is at least 23, and a contact resistance is at most 10 $m\Omega \cdot cm^2$.

In addition, in the method for manufacturing stainless steel for a fuel cell separator, the method may further include performing heat treatment at a temperature of 450 to 550° C. for 30 seconds or more before performing the primary and secondary electrolysis.

Advantageous Effects

According to the present disclosure, the actual contact area between the separator and the gas diffusion layer may be increased by controlling the Ssc and Sdq values, which are 3D surface parameters replacing the average surface roughness, which is a 2D surface parameter, and as a result, the contact resistance of the separator may be efficiently reduced.

According to the present disclosure, a fuel cell separator having a low contact resistance may be manufactured without performing an expensive coating process, or the like.

DESCRIPTION OF DRAWINGS

FIG. 1 is a graph illustrating the relationship between Ssc values and contact resistances based on results of Table 2.

FIG. 2 is a graph illustrating the relationship between Sdq values and contact resistances based on the results of Table 2.

FIG. 3 shows a 3D analysis result of a surface shape of a stainless steel of Comparative Example 3, and FIG. 4 shows a 3D analysis result of a surface shape of a stainless steel of Inventive Example 7.

BEST MODE

In a stainless steel for a fuel cell separator according to an embodiment of the present disclosure, an arithmetic mean summit curvature Ssc of the surface defined according to the ISO 25178 standard is at least 6.0 $\mu m^{-1}$, a root mean square surface slope Sdq is at least 23, and a contact resistance is at most 10 $m\Omega \cdot cm^2$.

Modes of the Invention

Hereinafter, embodiments of the present disclosure will be described in detail with reference to the accompanying drawings. The embodiments of the present disclosure may, however, be embodied in many different forms and should not be construed as being limited to the embodiments set forth herein. Rather, these embodiments are provided so that this disclosure will be thorough and complete, and will fully convey the concept of the invention to those skilled in the art.

Also, the terms used herein are merely used to describe particular embodiments. An expression used in the singular encompasses the expression of the plural, unless otherwise indicated. Throughout the specification, the terms such as "including" or "having" are intended to indicate the existence of features, operations, functions, components, or combinations thereof disclosed in the specification, and are not intended to preclude the possibility that one or more other features, operations, functions, components, or combinations thereof may exist or may be added.

Meanwhile, unless otherwise defined, all terms used herein have the same meaning as commonly understood by one of ordinary skill in the art to which this disclosure belongs. Thus, these terms should not be interpreted in an idealized or overly formal sense unless expressly so defined herein. As used herein, the singular forms are intended to include the plural forms as well, unless the context clearly indicates otherwise.

The terms "about", "substantially", etc. used throughout the specification means that when a natural manufacturing and a substance allowable error are suggested, such an allowable error corresponds the value or is similar to the value, and such values are intended for the sake of clear understanding of the present invention or to prevent an unconscious infringer from illegally using the disclosure of the present invention.

It is difficult to accurately predict an actual contact area between a separator and a gas diffusion layer using two-dimensional parameters, which have been conventionally used to reduce a contact resistance of a stainless steel for a fuel cell separator. Thus, the present inventors have made efforts to realize a surface shape of a separator capable of maximizing the actual contact area between the gas diffusion layer and the separator using new parameters.

An arithmetic mean summit curvature Ssc is a three-dimensional (3D) surface parameter defined according to the ISO 25178 standard, and a root mean square surface slope Sdq is a 3D parameter calculated by combining heights and frequency of peaks present on the surface of a separator. These parameters are affected by a 3D shape of the surface and affects the actual contact area between the separator and the gas diffusion layer, thereby effectively reducing the contact resistance of the separator.

The arithmetic mean summit curvature Ssc refers to an average of reciprocals of curvatures of summits (peaks) present on the surface and the unit thereof is $\mu m^{-1}$. The higher the Ssc value is, the sharper the peaks are on the surface of the separator in contact with the gas diffusion layer. The lower the Ssc value, the rounder the peaks are on the surface of the separator in contact with the gas diffusion layer.

The root mean square surface slope Sdq, as a surface parameter related to slopes of surface peaks, is an average square root of slopes of all peaks present on the surface. The Sdq value is a parameter related to gaps between surface peaks. The higher the Sdq value, the narrower gaps between the peaks on the surface of the separator, and the lower the Sdq value, the wider gaps between the peaks on the surface of the separator. An Sdq value of 0 means a perfectly flat surface without peaks, and an Sdq value of 1 means that the slopes of all peaks present on the surface are 45°.

In the stainless steel for a fuel cell separator according to an embodiment of the present disclosure, the arithmetic mean summit curvature Ssc of the surface may be at least 6.0 $\mu m^{-1}$, and the root mean square surface slope Sdq may be at least 23.

According to the present disclosure, sharp peaks with narrow gaps therebetween are formed on the surface of the separator by adjusting the Ssc and Sdq values within the ranges described above. The narrow gaps between peaks means a large number of peaks are present in a unit area indicating that the peaks are densely present on the surface. A separator in which the Ssc and Sdq values are controlled within the ranges described above may have an increased actual contact area with the gas diffusion layer, thereby having a significantly reduced contact resistance.

In the stainless steel for a fuel cell separator according to an embodiment of the present disclosure, a thickness of a passivated layer may be at most 3 nm. The thicker the passivated layer is, the more difficult the migration of electrons is to increase the contact resistance. In this regard, the thickness of the passivated layer may be at most 2 nm.

However, a slight difference of contact resistance between superiority and inferiority cannot be determined using only the thickness of the passivated layer, and the surface shape affecting the contact area is a major factor of the contact resistance. Although the range of center line average surface roughness, which is a 2D surface parameter, or the like has been conventionally used therefor, it is difficult to accurately predict the actual contact area between the separator and the gas diffusion layer by using only such 2D surface parameters. Therefore, the contact resistance may be significantly reduced by increasing the actual contact area between the separator and the gas diffusion layer by adjusting the ranges of the Ssc and Sdq values as 3D surface parameters in the present disclosure.

The stainless steel for a fuel cell separator according to an embodiment of the present disclosure may have a contact resistance value of at most 10 mΩ·cm².

The composition of alloying elements of the stainless steel for a fuel cell separator according to the present disclosure is not particularly limited as long as the Ssc and Sdq values satisfy the above-described ranges. However, a preferred composition of alloying elements is as follows. However, the composition is merely an example described in order to afford a better understanding of the present disclosure, and the technical ideas of the present disclosure are not limited to the example.

The stainless steel for a fuel cell separator according to an embodiment of the present disclosure may be a ferritic stainless steel including, in percent by weight (wt %), at most 0.02% of C, at most 0.02% of N, 15 to 35% of Cr, at most 0.03% of C+N, and the balance of Fe and other inevitable impurities. Also, the ferritic stainless steel according to the embodiment may further include at least one of, in percent by weight (wt %), at most 0.4% of Si, at most 0.2% of Mn, at most 2% of Cu and at most 1.0% of a sum of Ti, Nb, and V.

Hereinafter, reasons for numerical limitations on the contents of the alloying elements in the embodiment of the present disclosure will be described.

The content of C may be at most 0.02 wt %.

C, as an austenite-forming element, enhances high-temperature strength when added. However, an excess of C reacts with Cr to form a Cr carbide. As a result, corrosion resistance of a steel material may deteriorate and elongation and weldability may deteriorate in a ferritic stainless steel. In consideration thereof, the C content may be at most 0.02 wt % in the present disclosure.

The content of N may be at most 0.02 wt %.

N is an austenite phase-stabilizing element and improves strength and pitting corrosion resistance of a steel material as an element replacing Ni. However, an excess of N may deteriorate workability, such as elongation, of a steel material. In consideration thereof, the N content may be at most 0.02 wt % in the present disclosure.

The content of Cr may be from 15 to 35 wt %.

Cr is an element promoting formation of an oxide of a stainless steel and should be added in an amount of at least 15 wt % to obtain corrosion resistance. However, an excess of Cr may cause a problem of increasing sticking defects during hot rolling due to formation of dense oxide scales during the hot rolling. In consideration thereof, an upper limit of the Cr content may be set to 35 wt % in the present disclosure.

The content of C+N may be at most 0.03 wt %.

As well as the contents of C and N respectively limited as described above, the content of C+N may further be limited in consideration of workability. In the present disclosure, the content of C+N may be at most 0.03 wt %.

Although the contents are not essentially limited, the ferritic stainless steel according to an embodiment of the present disclosure may further include Si, Mn, Cu, Ti, Nb, and V, and may include at least one of, in percent by weight (wt %), at most 0.4% of Si, at most 0.2% of Mn, at most 2% of Cu, and at most 1.0% of a sum of Ti, Nb, and V.

Hereinafter, reasons for numerical limitations on the contents of the alloying elements will be described.

The content of Si may be at most 0.4 wt %.

Si improves high-temperature oxidation resistance and enhances corrosion resistance by strengthening a passivated layer of a stainless steel. However, an excess of Si deteriorates elongation, and thus the Si content may be at most 0.4 wt % in the present disclosure in consideration thereof.

The content of Mn may be at most 0.2 wt %.

Mn, like N, is an austenite phase-stabilizing element and is used for metastability of the austenite phase as an element replacing Ni. Although Mn enhances strength of a steel material when added, an excess of Mn may deteriorate workability, and thus the Mn content may be at most 0.2 wt % in the present disclosure in consideration thereof.

The content of Cu may be at most 2 wt %.

Cu, as an austenite phase-stabilizing element, improves corrosion resistance of a steel material when added. However, an excess of Cu may deteriorate hot workability of a steel material, and thus the Cu content may be at most 2 wt % in the present disclosure in consideration thereof.

The sum of the contents of Ti, Nb, and V may be at most 1.0 wt %.

Ti, Nb, and V are elements effective on forming a carbo-nitride using C and N contained in a steel. However, excessive amounts of Ti, Nb, and V deteriorate toughness and thus the sum of the contents of Ti, Nb, and V may be adjusted to at most 1.0 wt % in the present disclosure in consideration thereof. In this regard, at least one of Ti, Nb, and V may be contained and the sum of the contained alloying elements may be adjusted to at most 1.0 wt % in this case.

A stainless steel for a fuel cell separator according to another embodiment of the present disclosure may be an austenitic stainless steel including, in percent by weight (wt %), at most 0.09% of C, 15 to 30% of Cr, 7 to 15% of Ni, and the balance of Fe and other inevitable impurities. Also, the austenitic stainless steel according to the embodiment may further include at least one of, in percent by weight (wt %), at most 2.5% of Si, at most 3% of Mn, at most 3% of Mo, at most 0.3% of N, and at most 1.0% of a sum of Ti, Nb, and V.

Hereinafter, reasons for numerical limitations on the contents of the alloying elements will be described.

The content of C may be at most 0.09 wt %.

C, as an austenite-forming element, enhances high-temperature strength when added. However, an excess of C reacts with Cr to form a Cr carbide. As a result, corrosion resistance of a steel material may deteriorate and elongation and weldability may deteriorate. In consideration thereof, the C content may be at most 0.09 wt % in the present disclosure.

The content of Cr may be from 15 to 30 wt %.

Cr is an element enhancing corrosion resistance by promoting formation of an oxide of a stainless steel and should be added in an amount of at least 15 wt % to obtain corrosion resistance under the fuel cell environment. However, when Cr is excessively added, expensive Ni, Mn deteriorating corrosion resistance, and N deteriorating workability should be additionally added to stabilize an austenite phase. Therefore, the Cr content may be adjusted in the range of 15 to 30 wt % in the present disclosure in consideration thereof.

The content of Ni may be from 7 to 15 wt %.

Although Ni is an austenite phase-stabilizing element, Ni is expensive. Therefore, the Ni content may be adjusted in the range of 7 to 15 wt % in the present disclosure in consideration of price competitiveness.

Although the contents are not essentially limited, the austenitic stainless steel according to an embodiment of the present disclosure may further include Si, Mn, Mo, N, Ti, Nb, and V, and may include at least one of, in percent by weight (wt %), at most 2.5% of Si, at most 3% of Mn, at most 3% of Mo, at most 0.3% of N, and at most 1.0% of a sum of Ti, Nb, and V.

Hereinafter, reasons for numerical limitations on the contents of the alloying elements will be described.

The content of Si may be at most 2.5 wt %.

Si is an element enhancing corrosion resistance of a stainless steel. However, an excess of Si deteriorates elongation of a steel material and $SiO_2$ oxidative inclusions may deteriorate corrosion resistance of a steel material. In consideration thereof, the Si content may be at most 2.5 wt % in the present disclosure.

The content of Mn may be at most 3 wt %.

Mn, like N, is an austenite phase-stabilizing element and is used for metastability of the austenite phase as an element replacing Ni. Although Mn enhances strength of a steel material when added, an excess of Mn may deteriorate corrosion resistance, and thus the Mn content may be at most 3 wt % in the present disclosure in consideration thereof.

The content of Mo may be at most 3 wt %.

Mo is an element effective on enhancing corrosion resistance of a stainless steel. However, an excess of Mo may cause formation of a sigma phase to deteriorate corrosion resistance of a steel material and embrittlement and Mo is an expensive element, and thus the Mo content may be at most 3 wt % in the present disclosure in consideration thereof.

The content of N may be at most 0.3 wt % or less.

N is an austenite phase-stabilizing element and improves strength and pitting corrosion resistance of a steel material as an element replacing Ni. However, an excess of N may deteriorate workability, such as elongation, of a steel material. In consideration thereof, the N content may be at most 0.3 wt % in the present disclosure.

The sum of the contents of Ti, Nb, and V may be at most 1.0 wt %.

Ti, Nb, and V are elements effective on forming a carbonitride using C and N contained in a steel. However, excessive amounts of Ti, Nb, and V deteriorate toughness and thus the sum of the contents of Ti, Nb, and V may be adjusted to at most 1.0 wt % in the present disclosure. In this regard, at least one of Ti, Nb, and V may be contained and the sum of the contained alloying elements may be adjusted to at most 1.0 wt % in this case.

Methods for manufacturing the stainless steel for a fuel cell separator according to the present disclosure are not particularly limited as long as the Ssc and Sdq values of the stainless steel are adjusted within the ranges described above. Here, an example of a process of controlling a surface shape of a separator will be described below. However, it is to be noted that the following manufacturing process is merely for illustrative purposes, and technical ideas of the present disclosure are not limited thereto.

According to an embodiment of the present disclosure, the stainless steel for a fuel cell separator according to the present disclosure may be manufactured by surface-treating a cold-rolled steel sheet manufactured according to a common stainless steel-manufacturing process. According to a method for manufacturing a stainless steel for a fuel cell separator according to the present disclosure, a cold-rolled stainless steel sheet is immersed in a sulfuric acid solution, a primary electrolysis and a secondary electrolysis are performed, and then the stainless steel is immersed in a mixed acid solution.

The primary electrolysis according to an embodiment may be performed at a current density of 0.16 to 0.48 $A/cm^2$, and the secondary electrolysis according to the embodiment may be performed at a current density of 0.03 to 0.08 $A/cm^2$. According to an embodiment, a mixture of nitric acid and hydrofluoric acid may be used as the mixed acid solution and an immersion time may be 30 seconds or more.

According to the method for manufacturing the stainless steel for a fuel cell separator according to an embodiment of the present disclosure, heat treatment may be performed at a temperature of 450 to 550° C. for 30 seconds or more before the primary and second electrolysis processes.

Hereinafter, the present disclosure will be described in more detail through examples. However, it is necessary to note that the following examples are only intended to illustrate the present disclosure in more detail and are not intended to limit the scope of the present disclosure. This is because the scope of the present disclosure is determined by matters described in the claims and able to be reasonably inferred therefrom.

EXAMPLES

Ferritic stainless steel A and austenitic stainless steel B respectively having the compositions shown in Table 1 below were manufactured in the form of cold-rolled steel sheets using a cold rolling mill (Z-mill) and subjected to bright annealing heat treatment.

TABLE 1

| Steel type | Alloying element (wt %) | | | | | | | | | |
|---|---|---|---|---|---|---|---|---|---|---|
| | C | Si | Mn | Cr | Ni | Mo | Nb | V | Ti | N |
| A | 0.008 | 0.1 | 0.1 | 30 | 0.2 | — | 0.2 | 0.4 | 0.1 | 0.015 |
| B | 0.040 | 2.0 | 1.0 | 20 | 11.5 | 0.2 | — | — | — | 0.050 |

Subsequently, inventive examples and comparative examples were respectively prepared via processes for controlling the surface shape as shown in Table 2 below.

By way of example for better understanding of the surface shape-controlling processes shown in Table 2, the cold-rolled stainless steel sheet of Comparative Example 5 of Table 2 was immersed in a 18% sulfuric acid solution and subjected to a primary electrolysis at a current density of 0.07 $A/cm^2$ and then a secondary electrolysis at a current density of 0.03 $A/cm^2$. Then, the stainless steel was immersed in a single acid of 18% sulfuric acid for 5 seconds and then immersed in a mixed acid solution (15% nitric acid and 1% hydrofluoric acid) for 30 seconds.

After the surface shape-controlling processes, surfaces of the stainless steels of the inventive examples and comparative examples were analyzed. Average surface roughnesses Ra of the surfaces of the stainless steels and Ssc and Sdq values, which are 3D parameters obtained by combining heights and frequencies of peaks present on the surfaces, are shown in Table 2. Contact resistances of the inventive examples and comparative examples are also shown in Table 2.

TABLE 2

| | Steel type | Surface shape-controlling process | Ra (μm) | Ssc (μm$^{-1}$) | Sdq | Contact resistance (mΩcm$^2$) |
|---|---|---|---|---|---|---|
| Comparative Example 1 | A | a1 | 0.070 | 2.52 | 9.51 | 310.2 |
| Comparative Example 2 | A | a2 | 0.073 | 2.73 | 10.40 | 110.2 |
| Comparative Example 3 | A | — | 0.082 | 4.97 | 17.19 | 49.2 |
| Comparative Example 4 | B | b (0.33 A/cm$^2$) | 0.156 | 5.33 | 19.04 | 34.2 |
| Comparative Example 5 | A | b (0.07 A/cm$^2$) b (0.03 A/cm$^2$) c1 (4 sec) c2 | 0.077 | 5.46 | 19.56 | 34.0 |
| Comparative Example 6 | B | b (0.16 A/cm$^2$) b (0.02 A/cm$^2$) | 0.152 | 4.99 | 18.29 | 30.5 |
| Comparative Example 7 | B | b (0.4 A/cm$^2$) | 0.133 | 4.93 | 19.03 | 29.2 |
| Comparative Example 8 | A | b (0.07 A/cm$^2$) b (0.03 A/cm$^2$) c1 (5 sec) c2 | 0.076 | 5.34 | 19.37 | 29.0 |
| Comparative Example 9 | B | b (0.16 A/cm$^2$) b (0.08 A/cm$^2$) | 0.136 | 4.93 | 19.20 | 25.1 |
| Comparative Example 10 | A | a2 b (0.10 A/cm$^2$) b (0.03 A/cm$^2$) c2 | 0.088 | 5.81 | 21.57 | 18.2 |
| Comparative Example 11 | A | b (0.48 A/cm$^2$) b (0.01 A/cm$^2$) c1 (2 sec) c2 | 0.072 | 5.36 | 18.58 | 14.5 |
| Comparative Example 12 | B | b (0.4 A/cm$^2$) b (0.08 A/cm$^2$) | 0.127 | 5.50 | 22.18 | 14.0 |
| Comparative Example 13 | B | b (0.16 A/cm$^2$) b (0.02 A/cm$^2$) c2 | 0.204 | 5.65 | 21.67 | 10.7 |
| Inventive Example 1 | A | b (0.48 A/cm$^2$) b (0.03 A/cm$^2$) c (40 sec) c2 | 0.103 | 6.76 | 24.65 | 9.4 |
| Inventive Example 2 | B | b (0.16 A/cm$^2$) b (0.08 A/cm$^2$) c2 | 0.204 | 6.03 | 24.68 | 8.8 |
| Inventive Example 3 | A | b (0.48 A/cm$^2$) b (0.03 A/cm$^2$) c1 (40 sec) c2 | 0.117 | 7.90 | 30.80 | 8.3 |
| Inventive Example 4 | A | a1 b (0.48 A/cm$^2$) b (0.03 A/cm$^2$) c2 | 0.086 | 7.58 | 25.69 | 7.8 |
| Inventive Example 5 | B | b (0.16 A/cm$^2$) b (0.06 A/cm$^2$) c2 | 0.082 | 6.74 | 24.62 | 7.3 |
| Inventive Example 6 | A | b (0.48 A/cm$^2$) b (0.03 A/cm$^2$) c2 | 0.083 | 7.25 | 23.74 | 6.0 |
| Inventive Example 7 | A | b (0.41 A/cm$^2$) b (0.05 A/cm$^2$) c2 | 0.095 | 6.27 | 23.70 | 5.8 | a1: heat treatment at 500° C., for 30 seconds, a2: heat treatment at 200° C., for 30 seconds, b: 18% sulfuric acid electrolysis, c1: immersing in a single acid (18% sulfuric acid), c2: immersing in a mixed acid solution (15% nitric acid and 1% hydrofluoric acid) for 30 seconds Referring to the results of Table 2, it was confirmed that the stainless steels of Inventive Examples 1 to 7 had low contact resistances of at most 10 mΩ·cm$^2$ because the Ssc and Sdq values according to the present disclosure were satisfied.

Meanwhile, referring to Table 2, it was confirmed that the average surface roughnesses Ra were about from 0.08 to about 0.2 μm in the inventive examples, and the average surface roughnesses Ra were about from 0.07 to about 0.2 μm in the comparative examples. In comparison with the inventive examples, although the stainless steels of the comparative examples had similar average surface roughnesses Ra, the Ssc and Sdq values suggested by the present disclosure were not satisfied in the comparative examples and the contact resistances thereof exceeded 10 mΩ·cm$^2$.

Based on these results, it was confirmed that the average surface roughness Ra is not an appropriate parameter for predicting the actual contact area between the gas diffusion layer and the separator. Also, it was confirmed that it is preferable to control the Ssc and Sdq values, which are 3D parameters obtained by combining heights and frequencies of peaks present on the surface of the stainless steel according to the present disclosure in order to effectively reduce the contact resistance.

FIGS. 1 and 2 are graphs illustrating relationships between contact resistance and each of the Ssc and Sdq values, respectively. Referring to FIGS. 1 and 2, a low contact resistance of at most 10 mΩ·cm$^2$ may be obtained by controlling the Ssc value to at least 6 μm$^{-1}$ and the Sdq value to at least 23 as described in the present disclosure.

Referring to Table 2, the stainless steels of Comparative Examples 1 and 2 had lower Ssc and Sdq values than those of the stainless steel of Comparative Example 3 that had not treated with the surface shape-controlling process. This is because scales formed by heat treatment cover the fine and sharp peaks present on the surface so that the surface of the separator is changed to have rounder peaks compared to those before the heat treatment.

Referring to Comparative Examples 5 to 13, it was confirmed that the Ssc and Sdq values are changed in accordance with the surface shape-controlling processes and the contact resistances were also changed accordingly. Referring to the results of Comparative Examples 5 to 13, it was confirmed that the contact resistance tends to decrease as the Ssc and Sdq values increase. Based thereon, it was confirmed that the surface shape of the separator having sharp peaks densely present thereon is advantageous for increasing the actual contact area between the gas diffusion layer and the separator, thereby obtaining a low contact resistance.

FIG. 3 shows a 3D analysis result of the surface shape of the stainless steel of Comparative Example 3, and FIG. 4 shows a 3D analysis result of the surface shape of the stainless steel of Inventive Example 7. Referring to FIGS. 3 and 4, as a result of performing the surface shape-controlling processes, it was confirmed that fine, sharp peaks were densely present with narrow gaps therebetween in Inventive Example 7 since the Ssc value was 6.27 μm⁻¹ and the Sdq value was 23.7.

Referring to the surface shape-controlling process of Table 2, the process of immersing the stainless steel in the mixed acid solution was performed in Inventive Examples 1 to 7, and it was confirmed that it is preferable to perform the process of immersing the stainless steel in the mixed acid solution to obtain a low contact resistance of at most 10 mΩ·cm. The sulfuric acid electrolysis process was conducted twice, i.e., primary and secondary processes, and it was confirmed that it is preferable to perform a primary electrolysis at a current density of 0.16 to 0.48 A/cm², and then a secondary electrolysis at a current density of 0.03 to 0.08 A/cm².

However, in addition to the surface shape-controlling processes shown in Table 2, it is to be noted that a low contact resistance of at most 10 mΩ·cm² may be obtained by controlling the surface of the separator to have a Ssc value of at least 6.0 μm⁻¹ and a Sdq value of at least 23 via various electrolysis and immersion processes using acid solutions. It is to be noted that the sulfuric acid used in the electrolysis processes and nitric acid contained in the mixed acid solution may be replaced with an acid solution causing surface dissolution of the stainless steel such as hydrochloric acid and an oxidizer-containing solution.

While the present disclosure has been particularly described with reference to exemplary embodiments, it should be understood by those of skilled in the art that various changes in form and details may be made without departing from the spirit and scope of the present disclosure.

INDUSTRIAL APPLICABILITY

The stainless steel for separators according to the present disclosure may be applied to fuel cell separators by realizing a surface shape capable of maximizing an actual contact area between a gas diffusion layer and a separator.

The invention claimed is:

1. A stainless steel for a fuel cell separator, wherein the stainless steel is a ferritic stainless steel comprising, in percent by weight (wt %), at most 0.02% of C, at most 0.02% of N, 15 to 35% of Cr, at most 0.03% of C+N, and the balance of Fe and other inevitable impurities, and wherein an arithmetic mean summit curvature (Ssc) of a surface defined according to the ISO 25178 standard is at least 6.0 μm⁻¹, a root mean square surface slope (Sdq) is at least 23, and a contact resistance is at most 10 mΩ·cm².

2. The stainless steel according to claim 1, wherein the ferritic stainless steel further comprises at least one of, in percent by weight (wt %), at most 0.4% of Si, at most 0.2% of Mn, at most 2% of Cu, and at most 1.0% of a sum of Ti, Nb, and V.

3. The stainless steel according to claim 1, wherein a thickness of a passivated layer is at most 3 nm.

4. A stainless steel for a fuel cell separator, wherein the stainless steel is an austenitic stainless steel comprising, in percent by weight (wt %), at most 0.09% of C, 15 to 30% of Cr, 7 to 15% of Ni, and the balance of Fe and other inevitable impurities, and wherein an arithmetic mean summit curvature (Ssc) of a surface defined according to the ISO 25178 standard is at least 6.0 μm⁻¹, a root mean square surface slope (Sdq) is at least 23, and a contact resistance is at most 10 mΩ·cm².

5. The stainless steel according to claim 4, wherein the austenitic stainless steel further comprises at least one of, in percent by weight (wt %), at most 2.5% of Si, at most 3% of Mn, at most 3% of Mo, at most 0.3% of N, and at most 1.0% of a sum of Ti, Nb, and V.

6. The stainless steel according to claim 4, wherein a thickness of a passivated layer is at most 3 nm.

*    *    *    *    *